US011412380B1

(12) United States Patent  
Larsen et al.

(10) Patent No.: US 11,412,380 B1  
(45) Date of Patent: Aug. 9, 2022

(54) NONINTRUSIVE HEADPHONE PIN LOCK

(71) Applicant: Sony Group Corporation, Tokyo (JP)

(72) Inventors: Tonni Sandager Larsen, San Diego, CA (US); Ted Yamazaki, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/202,204

(22) Filed: Mar. 15, 2021

(51) Int. Cl.
*H04R 1/10* (2006.01)
*H04W 12/06* (2021.01)
*H04W 4/80* (2018.01)
*H04R 3/12* (2006.01)
*H04W 88/02* (2009.01)

(52) U.S. Cl.
CPC .............. *H04W 12/06* (2013.01); *H04R 3/12* (2013.01); *H04W 4/80* (2018.02); *H04W 88/02* (2013.01); *H04R 2420/07* (2013.01)

(58) Field of Classification Search
CPC ....................................................... H04R 1/10
See application file for complete search history.

(56) References Cited

U.S. PATENT DOCUMENTS

2008/0274696 A1* 11/2008 Bakshi ............... H04M 1/6066 455/41.2
2014/0080544 A1  3/2014 Chen

FOREIGN PATENT DOCUMENTS

| CN | 109788463 | 5/2019 |
| WO | WO2019168661 | 9/2019 |

\* cited by examiner

*Primary Examiner* — Olisa Anwah
(74) *Attorney, Agent, or Firm* — Trellis IP Law Group, PC

(57) ABSTRACT

A method of discouraging theft of a set of headphones from a rightful user includes, when first connecting the headphones to a first cell phone, requesting transmission of an ID number for the first cell phone from the first cell phone to the headphones, requesting the rightful user to provide a personal identification number (PIN) for the headphones; and storing the ID number and PIN in the headphones. At any subsequent attempt by a user to connect the headphones to a second cell phone, the second cell phone's ID number is requested and compared with the stored ID number for the first cell phone. If the ID numbers match, full functional connection between the headphones and the second cell phone is allowed, but if they do not, full functional connection is blocked until the user provides the PIN for the set of headphones.

20 Claims, 5 Drawing Sheets

NONINTRUSIVE HEADPHONE PIN LOCK

BACKGROUND

Headphones intended for use while wirelessly connected to a user's cell phone are not only easily misplaced but can be an attractive target for theft. A typical user only uses headphones intermittently, not whenever the cell phone is used, meaning that headphones may sometimes be operationally connected to the cell phone and sometimes not, and the likelihood of someone other than the rightful user of the cell phone and the headphones coming across the headphones by chance is quite high.

Various authentication mechanisms could of course ensure that anyone trying to use the headphones is indeed entitled to do so, by requiring them to provide information that would only be known to one particular user. One approach to achieving this might be for any user attempting to connect the headphones to be required to enter ID information of some sort into the cell phone before a full functional connection can be established. The information could be either a PIN number that the rightful user has made up to identify those headphones, or some personal data that the rightful user has consented to using as a means of identifying them, as a unique individual. In either case, the ID information may be stored when initially pairing the headphones in question with the corresponding cell phone. The idea is that if and when any other user attempts to use those same headphones and is prompted to enter the PIN or other ID, they will be unable to provide it, and an operational lock mechanism of some sort is instated, preventing the headphones from pairing with any cell phone, and in essence rendering them useless to the potential or actual thief.

The problem with these approaches is that every time the rightful user tries to use those headphones after any temporary disconnection, they too will be prompted for the ID information and must enter it before the lock mechanism is released, allowing the headphones to be used as desired. This intrusive step at best causes an irritating delay, and is often very annoying to the rightful user, who may well react by disabling the authentication mechanism altogether and may at least partially explain why "anti-theft" features for headphones are not currently in common use. This invention aims to provide a "theft spoiling" mechanism that is non-intrusive, and nearly invisible to the rightful owner of the headphones. This would in effect render the use of a particular set of headphones impractical except to the rightful user, without requiring a manual authentication step to be performed each and every time the headphones are connected to a cell phone.

SUMMARY

Embodiments generally relate to methods and systems that discourage theft of headphones by rendering them essentially unusable to anyone other than the rightful user.

In one embodiment, a method comprises, at an initial occasion of connection between the set of headphones and a first cell phone: requesting transmission of an ID number for the first cell phone from the first cell phone to the set of headphones; requesting the rightful user to provide a personal identification number (PIN) for the set of headphones; and storing the ID number for the first cell phone and the provided PIN in the set of headphones. At any subsequent attempt by a user to connect the set of headphones to a second cell phone, transmission of an ID number for the second cell phone from the second cell phone to the set of headphones is requested, and the ID number for the second cell phone is compared with the stored ID number, wherein: if the ID number for the second cell phone matches the stored ID number, full functional connection of the set of headphones to the second cell phone is allowed; and if the ID number for the second cell phone does not match the stored ID number for the first cell phone, full functional connection between the set of headphones and the second cell phone is blocked until the user provides the PIN for the set of headphones.

In another embodiment, a method comprises, at an initial occasion of connection between the set of headphones and a first cell phone: requesting transmission of an ID number for the first cell phone from the first cell phone to the set of headphones; requesting the rightful user to provide a personal identification number (PIN) for the set of headphones; and storing the ID number for the first cell phone and the provided PIN in the set of headphones. At any subsequent attempt by a user to connect the set of headphones to a second cell phone, transmission of an ID number for the second cell phone from the second cell phone to the set of headphones is requested, and the ID number for the second cell phone is compared with the stored ID number, wherein: if the ID number for the second cell phone matches the stored ID number, full functional connection of the set of headphones to the second cell phone is allowed; and if the ID number for the second cell phone does not match the stored ID number for the first cell phone, full functional connection between the set of headphones and the second cell phone is blocked until the user either provides the PIN for the set of headphones, or successfully completes a predetermined recovery process.

In yet another embodiment, a system that discourages theft comprises one or more processors and a non-volatile memory in the set of headphones; and software encoded in one or more computer-readable media for execution by the one or more processors. The software when executed is operable to: at an initial occasion of connection between the set of headphones and a first cell phone, request transmission of an ID number for the first cell phone from the first cell phone to the set of headphones; request the rightful user to provide a personal identification number (PIN) for the set of headphones; and store the ID number and the PIN in the non-volatile memory. At any subsequent attempt by a user to connect the set of headphones to a second cell phone: transmission of an ID number for the second cell phone from the second cell phone is requested; and the ID number for the second cell phone is compared with the stored ID number for the first cell phone; wherein: if the ID number read from the second cell phone matches the stored ID number, full functional connection between the set of headphones and the second cell phone is allowed; and if the ID number for the second cell phone does not match the stored ID number, full functional connection between the set of headphones and the second cell phone is blocked until either the user provides the PIN for the set of headphones, or a predetermined recovery process is conducted.

A further understanding of the nature and the advantages of particular embodiments disclosed herein may be realized by reference of the remaining portions of the specification and the attached drawings.

DETAILED DESCRIPTION OF EMBODIMENTS

Embodiments described herein are directed to methods and systems that discourage theft of headphones intended to be used as peripherals for a wirelessly connected device, such as a cell phone, without placing undue demands on the user to establish rightful use every time the headphones are reconnected after a period of time of disconnection.

The present invention may be considered to have two parts. The first part is a theft-spoiling mechanism located within a set of headphones, and which when enabled communicates with the user's cell phone to check whether the user is entitled to use the headphones according to identifying criteria discussed below. The second part is an interface that may be housed entirely within the headphones or entirely in the cell phone (which in this case must be a smart phone) or split between the two, and which is used to enable or disable the theft-spoiling mechanism, as well as providing PIN input when necessary. Some of the various implementations of the interface will be described in detail later in this disclosure.

While the description of the present invention in this disclosure refers to protecting a headphone set used in conjunction with a cell phone, the methods could readily be applied for use with devices such as music players, TV's, soundbars or other such wirelessly connected devices.

Figure 1:
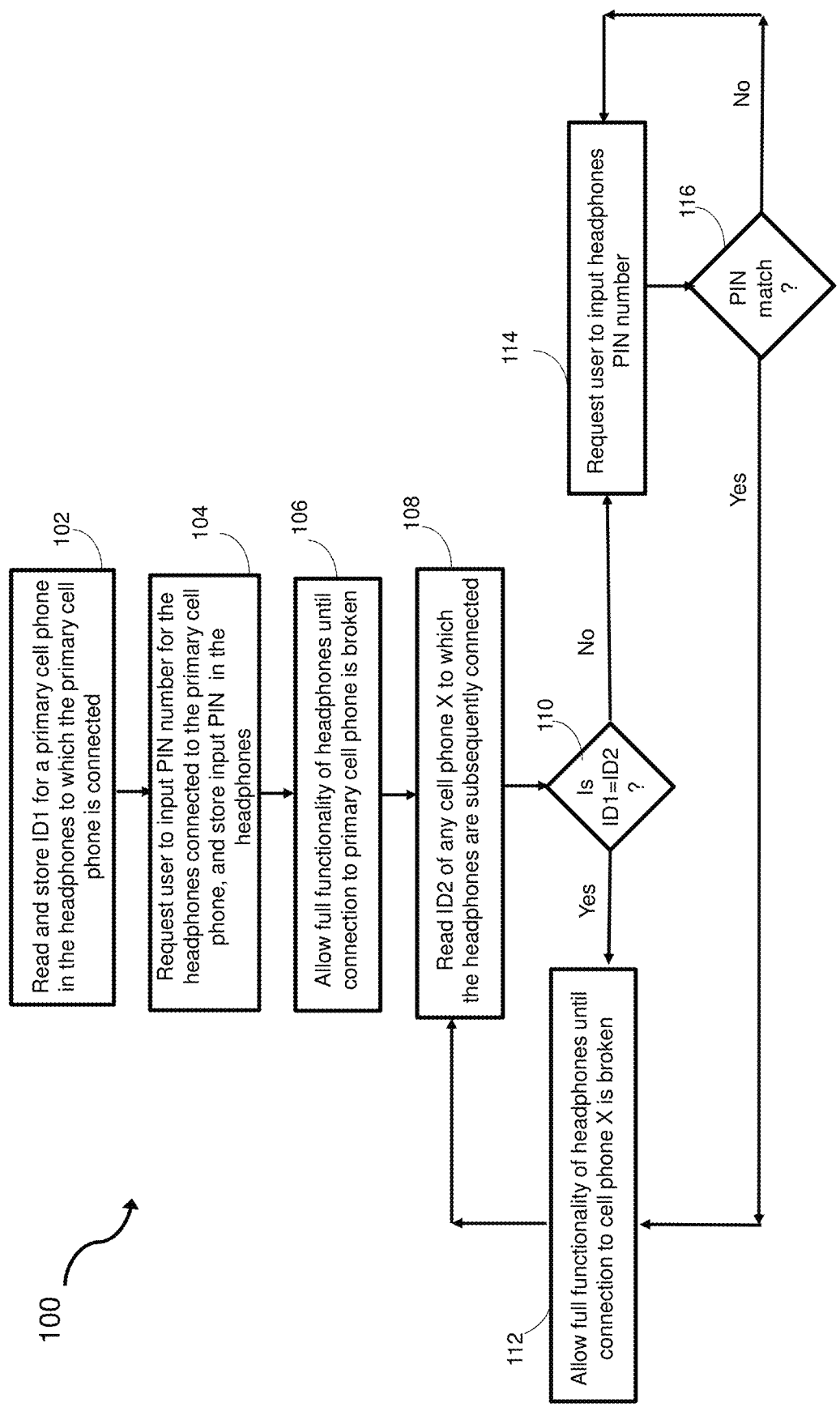
FIG. 1 is a flowchart of a method for discouraging headphone theft according to some embodiments.

FIG. 1 is a flowchart illustrating a method 100 of carrying out some embodiments of the present invention. The first three steps, 102, 104, and 106, of this method would normally be carried out just once, the first time a particular set of headphones is connected to a particular cell phone by a rightful user of both devices. At step 102, a processor in the headphones obtains an ID number uniquely identifying the cell phone, and then stores that in non-volatile memory in the headphones. This would not require any action to be taken by the rightful user, as the headphones' processor would automatically request the ID number, and a processor in the cell phone would probably provide it, generating it if necessary. In some embodiments, especially if the device to which the headphone set is connected is "dumb" rather than "smart", the ID number could simply be the Bluetooth MAC address of the cell phone.

At step 104, the rightful user is asked to input a personal identification number (PIN) for those headphones, and that PIN is also stored in the headphones' memory. In some embodiments, the order in which steps 102 and 104 are carried out may be reversed. In some embodiments, not shown, the sequence of operations may be to read the cell phone ID in a first step, then request and receive the PIN in a second step, or vice versa, and then store both items in a third step.

In some embodiments, instead of using a numerical PIN, as described in most of this disclosure, another user-generated data item such as a password, button combinations, voice ID, or a passphrase may be used in essentially the same way to achieve the same ends.

It should be noted that ownership of headphones offering the pin-lock/theft-spoiling features of the present invention does not compel the user to take advantage of that feature. It is simply an option, which the user could choose to enable. At any time after enabling the feature, the rightful user could also disable it, or re-enable it as and when desired, using an interface either in the headphones or in the cell phone as described elsewhere in this disclosure.

At step 106, after the two identifying or authenticating data items have been stored, full functionality of the headphones is established, and maintained until the connection to the cell phone is broken, typically in response to a deliberate action by the user.

Step 108 is carried out at a later time, if and when a would-be user—either the rightful user or any other person who comes into possession of the headphones—attempts to connect those headphones to a cell phone (labelled "X" in the figure) which could be but is not necessarily the same cell phone involved in earlier steps of method 100. The ID number of this "second" cell phone is read at step 108, and at step 110, a processor in the headphones compares the read ID number with the ID number previously stored in the headphones' memory. In general, of course, the user is very likely to be the rightful user, and the cell phone would be the same cell phone to which the headphones were previously connected, so the ID numbers would be a perfect match, and the method would progress to step 112. At this step, the method allows full functionality of headphones, and this functionality is maintained until the connection to the cell phone is broken.

Therefore, in this "normal" case, where the rightful user is using the same cell phone as usual, no particular action is required of the user to authenticate themselves or the devices. More specifically, the user is not asked to provide the headphone PIN. This satisfies one goal of the present invention—minimizing demands on the rightful user—by essentially making no demands at all!

However, if it is found at step 110 that the read and the stored ID numbers do not match, the cell phone to which the would-be user is attempting the headphones cannot be the same cell phone to which the headphones were previously connected. One explanation for this is an "innocent" case where the rightful user of the headphones has either replaced their original cell phone with another, or simply has two or more phones, and sometimes alternates between one and another. Another explanation is that the would-be user is not the rightful user, and either deliberately stole the headphones or found them after the rightful user accidentally mislaid them. The illustrated method 100 addresses both possibilities by progressing to step 114 where the would-be user is asked to input the headphones PIN number.

At this point, in most cases, if the would-be user is the rightful user although with a different cell phone, they would be able to provide a PIN at step 114, that is compared with the stored PIN at the next step 116 and found to match the stored PIN, so control would then move from step 114 to step 112, at which full functionality of headphones will be allowed, and then maintained until the cell phone connection is broken.

However, if the would-be user is not the rightful user, they would be unable to provide a PIN in response to step 114 that would be found at step 116 to be a match for the stored PIN. In this case, the method would flow to step 114 (or remain there if the user does not enter any PIN), at which a PIN is again requested, and the same sequence from 114 to 116 is repeated over and over again, without ever allowing full functionality of the headphones. The intended result is that the user would give up trying to make a proper connection, and would abandon the headphones (which ideally would eventually be restored to the rightful user). The step 114 request made to the user, to provide the PIN, would typically be made in the form of an audible spoken message, but in some cases, at a second or subsequent pass through step 114 after failing to receive a correct PIN, the spoken message may be accompanied by an annoying tone or tonal sequence played through the headphones, as an additional incentive to a user other than the rightful user to give up.

The method flow between steps 114, 116 and 112 causes the user to be presented with a repeating audible voice prompt that can only be stopped by the user entering the correct PIN.

It should be noted that steps 116 and 110, which carry out the PIN comparison and the cell phone ID comparison respectively, are carried out in the headphones. In terms of the functional "division" of the invention between mechanism and interface mentioned earlier in this disclosure, these steps lie at the heart of the "theft-spoiling" mechanism. However, the location (or locations) of the interface allowing the user to provide the PIN is not obvious in the method flow representation of FIG. 1, as it will differ in different implementations.

In some implementations, the interface allowing the user to provide this input resides in the headphones themselves. As mentioned above, this interface may also allow the theft-spoiling mechanism to be enabled or disabled. This could be done via on-headphone voice commands, on-headphone button presses, or other means. A good quality microphone is required for the former, buttons or other tactile input elements are for the latter, and a powerful processor has to be provided for either. The main drawback of these implementations is, therefore, additional cost.

In other implementations, the interface by which the theft-spoiling aspect of the invention may be enabled, disabled and facilitated is provided by the smart phone, in the form of an optional feature within an app, called herein a headphone companion app, that can be downloaded and installed on a smart phone. Basic headphone operations are generally possible without downloading and installing the headphone companion app, but if the user wants to enable the "theft-spoiling" feature (or any of the many other optional features modern high-end headphones usually have (e.g. noise cancellation, equalizer settings etc), the user will have to download and install the headphone companion app. Enabling the theft-spoiling option within the app then provides the user with a convenient way to enable or disable theft-spoiling, and to input the PIN code when requested by the headphone set to do so. Cost is clearly reduced in these app-based implementations, where the user already possesses a suitable smart phone with the processing power, a keyboard etc.

Apps designed to interface with headphones of particular makes and models are readily available for download and installation, either from manufacturers' websites or more generic app "stores". Such apps provide a convenient way to facilitate the desired reactions or behavior of elements in the headphones or cell phone interface.

Figure 2:
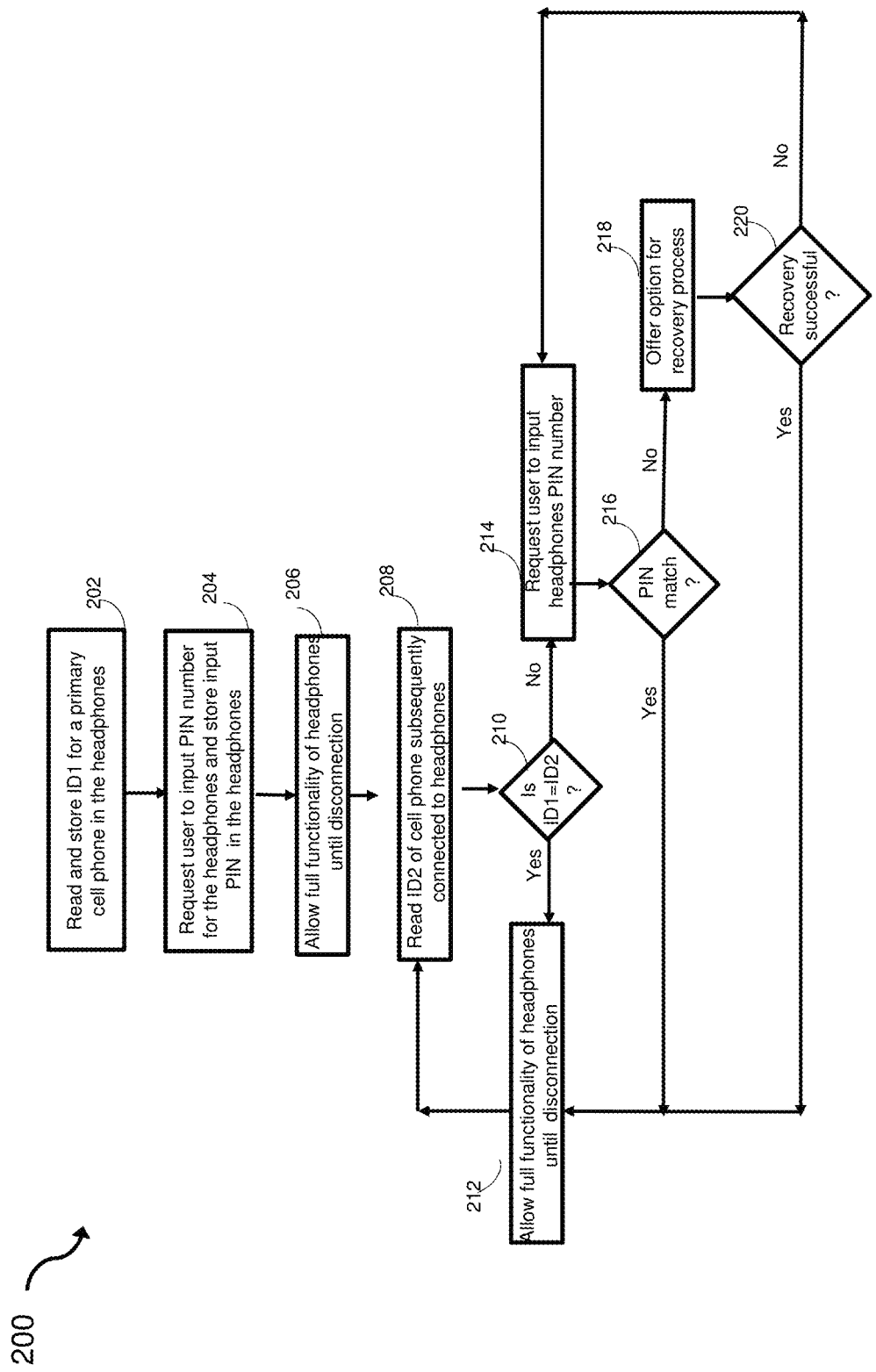
FIG. 2 is a flowchart of a method for discouraging headphone theft according to some other embodiment.

In some cases, even the rightful user may run into a problem providing the correct PIN number at step 108, having forgotten it. FIG. 2 is a flowchart illustrating steps of method 200 which would address this possibility. Steps 202 through 216 correspond exactly to steps 102 through 116 of method 100, but in method 200, the result of a determination that the PINs don't match is a new step, step 218, where the would-be user is offered the option of a recovery process.

One possibility for such a process is for the user to be asked to supply personally authenticating information. In other words, the user could be authenticated as the rightful user by supplying personal information as uniquely identifying them. Such information could have previously established, possibly in some sort of registration process soon after purchase of the headphones. Another possibility for the recovery process is for the user to be asked to input a recovery PIN uniquely identifying the headphones, where that recovery PIN would have been previously supplied by the manufacturer to the purchaser of the headphones and would presumably still be accessible to the rightful user.

Returning to FIG. 2, step 220 determines if the user successfully complied with the recovery process (for example, by providing the correct recovery PIN). Success moves the method flow to step 212 at which full functionality of headphones will be allowed, and then maintained until the cell phone connection is broken. In some cases, not shown, if the correct recovery PIN is provided, after full functionality is restored, the method terminates; this means that the protection mechanism provided by method 200 is disabled. If the user later wants to enable protection as afforded by the present invention, they must restart the method at step 202.

If the user fails to complete the recovery process, method flow returns to step 214, once again asking the user to supply a PIN matching the stored PIN. A wrongful user will thus be trapped in the loop of steps (214 to 216 to 218 to 220 and back to 214) indefinitely, without ever gaining access to fully functional headphones.

As in the case of the slightly simpler method 100, the intended result is that the user would give up trying to make a proper connection, and would abandon the headphones (which ideally would eventually be restored to the rightful user). The step 214 request made to the user, to provide the PIN would typically be made through the headphones in the form of an audible spoken message, but in some cases, at a second or subsequent pass through step 114 after failing to receive a correct PIN, the spoken message may be accompanied by an annoying tone or tonal sequence played through the headphones, as an additional incentive to a user other than the rightful user to give up.

In cases where the recovery process also includes a request for a PIN, in this case the recovery PIN, a second of subsequent pass through step 220 may also involve playing an audible message accompanied by an annoying tone or tonal sequence played through the headphones.

It should be noted that the PIN lock mechanism of the present invention, with embodiments including those described above as methods 100 and 200, is completely separate from the standard Bluetooth pairing and connection mechanism used with current cell phone-headphone systems, so it can easily be implemented without worrying about interfering with the fundamental Bluetooth functionality. The anti-theft/theft-spoiling mechanism doesn't actually prevent a user from pairing and using the headphones— it's just the repeating voice (or other intrusively audible) prompt that basically renders the headphones useless when a PIN code is found to be required. Relying on the overlaid audible prompt and not interfering with the normal Bluetooth pairing/connection mechanism, also minimizes confusion as to why the headphones are not working as expected. The headphones themselves literally tell the user what is going on and what the user needs to do to unlock them, thus removing the prompt.

Figure 3:
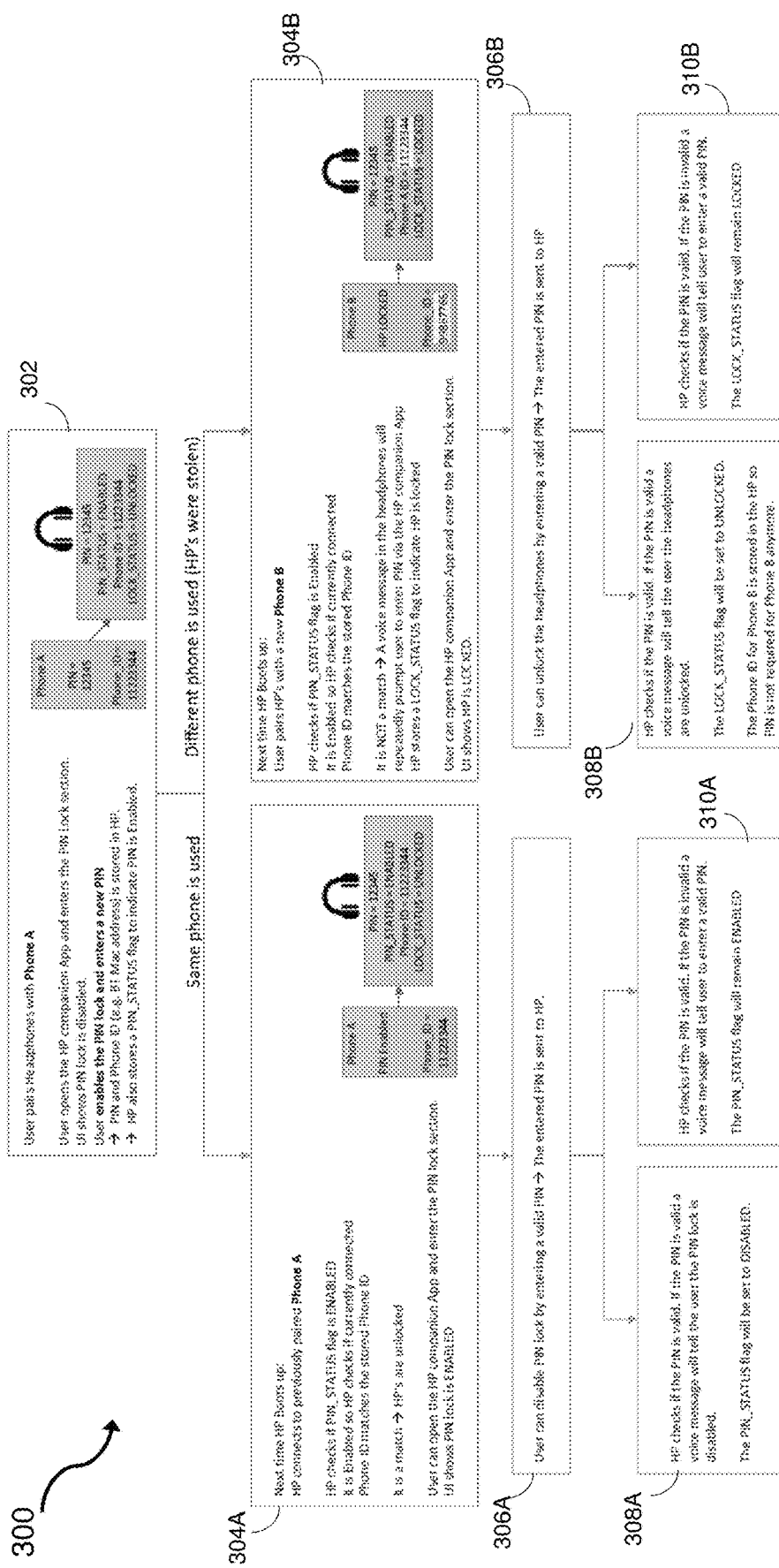
FIG. 3 is a flowchart of a method for discouraging headphone theft according to yet other embodiments.

Many ways of implementing methods according the present invention, such as methods 100 and 200, may be envisaged by one of skill in the art of interfacing and control of cell phones accessories such as headphones. FIG. 3 is a flowchart illustrating steps of a method 300, roughly corresponding to method 100 but including details that may be involved in some implementations. This example assumes that the rightful user of the headphones has already installed onto their cell phone an app (referred to in the figure as the HP companion App) designed to control the particular make and model of the headphones. It includes details such as enabling or disabling flags for PIN status or lock status, but other options could work in other implementations without departing from the spirit of this invention.

The details in box 302 show how the phone ID and the headphones' PIN data may be input and stored, corresponding roughly to steps 102 and 104 of method 100 (or steps 202 and 204 of method 200), and including specifics like the setting of a PIN status flag. The details in box 304A show how the method would progress for the case corresponding to flow through steps 108, 110 and 112 of method 100 (or steps 208, 210, and 212 of method 200), where the cell phone IDs match. The details in box 304B show how the method would progress for the case roughly corresponding to steps 108, 110, and 114 (or 208, 210, and 214) where the cell phone IDs do not match. The details in boxes 306A and 306B correspond to step 114 (or 214), in boxes 308A and 308B to the flow from 116 to 112 (or 216 to 212), and the details in boxes 310A and 310B to the flow from 116 to 114.

As discussed above with respect to method 200, in some embodiments a unique "recovery" PIN could be pre-stored in each set of headphones and printed in packing material for each unit as a backup in case the user forgets their own PIN.

Figure 5:
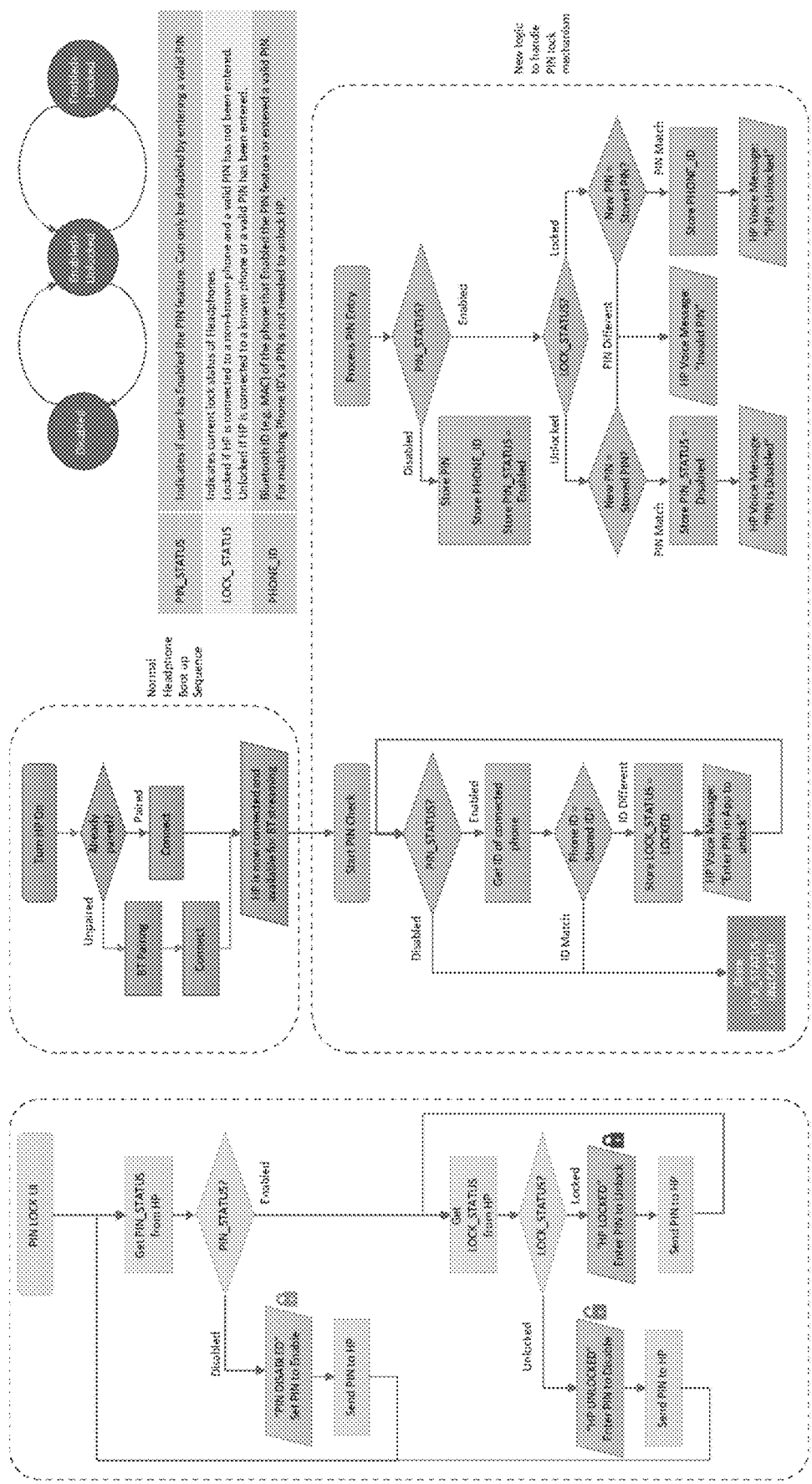
FIG. 5 is a visualization of the flow of operations carried out by a headphone app configured to carry out methods according to some embodiments.

FIG. 5 is a visualization of the flow of operations carried out by a headphone app configured to carry out methods according to the present invention. Operations performed at the cell phone itself are shown in the dashed box on the left, and those at the headphones in the other two dashed boxes on the right. The graphic in the upper right corner indicates correspondences between enabled or disabled status flags with locked or unlocked states of the headphones.

Figure 4:
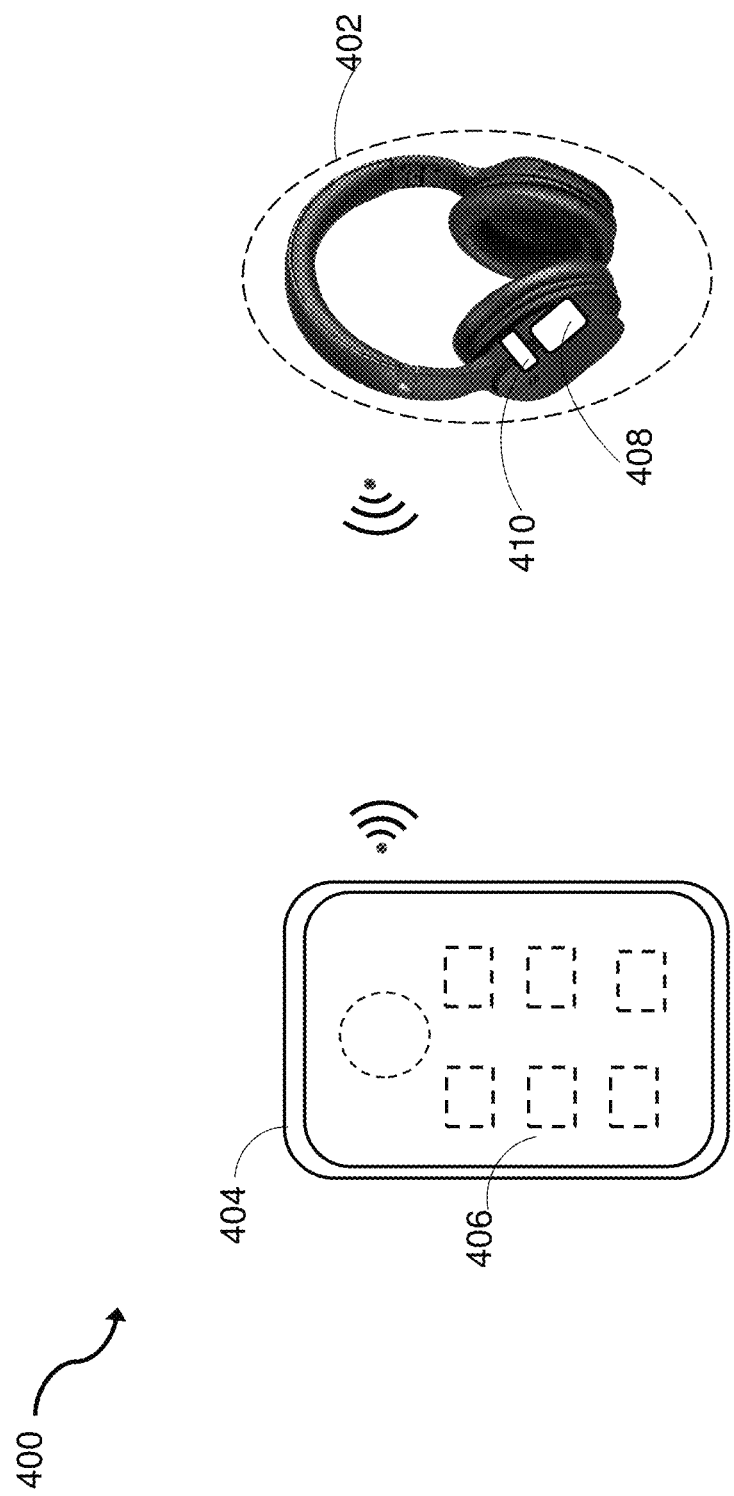
FIG. 4 is a system that discourages headphone theft according to some embodiments.

FIG. 4 is a schematic illustration of a system 400 that discourages headphone theft of headphones 402 according to some embodiments of the present invention. Cell phone 404 includes one or more processors 406 running software that operates in cooperation with headphones 402, and more particularly with a processor 408 and non-volatile memory 410 housed within the headphones. Memory 410 is used to store the ID number of cell phone 404 and the headphone PIN number supplied by the rightful user at an initial occasion of connection, as discussed above in detail with respect to FIG. 1. As noted in the description of methods 100 and 200, and as shown in the FIG. 5 visualization, a headphones companion app in the cell phone allows the user to enable or disable the theft deterrence "headphone lock" mechanisms of the present invention, and to input PINs when requested by the headphones, while one or more processors in the headphones handle all the other processes necessary to carry out the methods, including most significantly the initial storing of identifying data, and the comparisons of those data with nominally corresponding identifying data read or otherwise received subsequently.

Embodiments described herein provide various benefits to users of smart devices such as cell phones intended to be used with wirelessly connected headphones. In particular, some embodiments attempt to discourage theft of the headphones by rendering them impossible or at least very difficult to use unless they are being used by the same user who initially paired them with a particular cell phone, and who may be taken to be the rightful user. Moreover, the sense of security afforded is achieved without placing undue burden on the user to consciously perform an authentication step every time the headphones are reconnected after a period of disconnection. This is achieved by only requesting input from the rightful user—and that input usually being a single item of easily memorized data—on the rare occasions when a different cell phone is used.

Although the description above of the present invention has been presented with respect to particular embodiments thereof, these particular embodiments are merely illustrative, and not restrictive. The methods discussed above could even be applied to cell phone-related devices other than headphones, such as fitness monitors, smart glasses or head mounted displays, for example.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method of discouraging theft of a set of headphones from a rightful user; the method comprising:
    at an initial occasion of connection between the set of headphones and a first cell phone:
        requesting transmission of an ID number for the first cell phone from the first cell phone to the set of headphones;
        requesting the rightful user to provide a personal identification number (PIN) for the set of headphones; and
        storing the ID number for the first cell phone and the provided PIN in the set of headphones; and
    at any subsequent attempt by a user to connect the set of headphones to a second cell phone, requesting transmission of an ID number for the second cell phone from the second cell phone to the set of headphones and comparing the ID number for the second cell phone with the stored ID number, wherein:
        if the ID number for the second cell phone matches the stored ID number, full functional connection of the set of headphones to the second cell phone is allowed; and
        if the ID number for the second cell phone does not match the stored ID number for the first cell phone, full functional connection between the set of headphones and the second cell phone is blocked until the user provides the PIN for the set of headphones.

2. The method of claim 1,
wherein in response to the request for transmission of an ID number for the first cell phone from the first cell phone to the set of headphones at the initial occasion of connection, a headphone companion app present in the first cell phone generates a unique ID number for the first cell phone and transmits the unique ID number to the set of headphones.

3. The method of claim 1,
wherein in response to the request for the rightful user to provide a personal identification number (PIN) for the set of headphones, a headphone companion app present in the first cell phone first provides the user with an interface at which the PIN may be input and then transmits the PIN to the set of headphones.

4. The method of claim 1,
wherein if the ID number for the second cell phone does not match the stored ID number for the first cell phone, the user is requested by the set of headphones to input a PIN for the set of headphones to be compared with the stored PIN.

5. The method of claim 4,
wherein the user inputs the PIN for the set of headphones using an interface at the set of headphones.

6. The method of claim 4,
wherein the user inputs the PIN for the set of headphones using an interface at the second cell phone; and
wherein the interface subsequently transmits the input PIN to the set of headphones.

7. The method of claim 4,
wherein requesting the user to input the PIN comprises requesting the user to download and install into the second cell phone a headphone companion app, if the headphone companion app is not already operational in the second cell phone.

8. The method of claim 2,
wherein the headphone companion app responds to PIN status data and LOCK status data received from the set of headphones to setup appropriate app UI and app behavior.

9. The method of claim 2,
wherein the headphone companion app transmits user entered PIN data to the set of headphones, the set of headphones responding by processing the PIN data, and updating PIN status data, LOCK status data and behavior of the set of headphones as appropriate.

10. A method of discouraging theft of a set of headphones from a rightful user; the method comprising:
    at an initial occasion of connection between the set of headphones and a first cell phone:
        requesting transmission of an ID number for the first cell phone from the first cell phone to the set of headphones;
        requesting the rightful user to provide a personal identification number (PIN) for the set of headphones; and
        storing the ID number for the first cell phone and the provided PIN in the set of headphones; and
    at any subsequent attempt by a user to connect the set of headphones to a second cell phone, requesting transmission of an ID number for the second cell phone from the second cell phone to the set of headphones and comparing the ID number for the second cell phone with the stored ID number, wherein:
        if the ID number for the second cell phone matches the stored ID number for the first cell phone, full functional connection of the set of headphones to the second cell phone is allowed; and
        if the ID number for the second cell phone does not match the stored ID number for the first cell phone, full functional connection between the set of headphones and the second cell phone is blocked until the user either provides the PIN for the set of headphones, or successfully completes a predetermined recovery process.

11. The method of claim 10,
wherein the predetermined recovery process comprises a personal authentication of the user as the rightful user.

12. The method of claim 10,
wherein the predetermined recovery process is provision of a recovery PIN by the user, the recovery PIN having been supplied by a manufacturer of the set of headphones to the rightful user at a time of purchase of the set of headphones.

13. The method of claim 10,
wherein in response to the request for transmission of an ID number for the first cell phone from the first cell phone to the set of headphones at the initial occasion of connection, a headphone companion app present in the first cell phone generates a unique ID number for the first cell phone and provides the unique ID number to the headphones.

14. The method of claim 10,
wherein if the ID number for the second cell phone does not match the stored ID number for the first cell phone, the user is requested by the set of headphones to input a PIN for the set of headphones to be compared with the stored PIN.

15. The method of claim 14,
wherein the user inputs the PIN for the set of headphones using an interface at the set of headphones.

16. The method of claim 14,
wherein the user inputs the PIN for the set of headphones using an interface at the second cell phone; and
wherein the interface subsequently transmits the input PIN to the set of headphones.

17. The method of claim 14,
wherein requesting the user to input the PIN comprises requesting the user to download and install into the second cell phone a headphone companion app, if the headphone companion app is not already operational in the second cell phone.

18. A system that discourages theft of a set of headphones from a rightful user, the system comprising:
one or more processors and a non-volatile memory in the set of headphones; and
software encoded in one or more computer-readable media for execution by the one or more processors and when executed operable to:
at an initial occasion of connection between the set of headphones and a first cell phone:
request transmission of an ID number for the first cell phone from the first cell phone to the set of headphones;
request the rightful user to provide a personal identification number (PIN) for the set of headphones; and
store the ID number and the PIN in the non-volatile memory; and
at any subsequent attempt by a user to connect the set of headphones to a second cell phone:
request transmission of an ID number for the second cell phone from the second cell phone; and
compare the ID number for the second cell phone with the stored ID number for the first cell phone;
wherein:
if the ID number read from the second cell phone matches the stored ID number, full functional connection between the set of headphones and the second cell phone is allowed; and
if the ID number for the second cell phone does not match the stored ID number, full functional connection between the set of headphones and the second cell phone is blocked until either the user provides the PIN for the set of headphones, or a predetermined recovery process is conducted.

19. The system of claim 18,
wherein the predetermined recovery process comprises an authentication of the user as the rightful user.

20. The system of claim 18,
wherein the predetermined recovery process is provision of a recovery PIN by the user, the recovery PIN having been supplied by a manufacturer to the rightful user at a time of purchase of the set of headphones.

* * * * *